United States Patent [19]

Schlennert

[11] Patent Number: 5,346,540
[45] Date of Patent: Sep. 13, 1994

[54] COLORED LEAD

[75] Inventor: Barbara Schlennert, Grosshabersdorf, Fed. Rep. of Germany

[73] Assignee: A. W. Faber-Castell Unternehmensverwaltung GmbH & Co., Stein, Fed. Rep. of Germany

[21] Appl. No.: 9,473

[22] Filed: Feb. 1, 1993

[30] Foreign Application Priority Data

Feb. 7, 1992 [DE] Fed. Rep. of Germany ... 9201503[U]

[51] Int. Cl.$^5$ .............................................. C09D 13/00
[52] U.S. Cl. ................... 106/19 B; 106/19 C; 106/19 D
[58] Field of Search ................ 106/19 B, 19 C, 19 R, 106/19 D

[56] References Cited

U.S. PATENT DOCUMENTS

| 2,280,988 | 4/1942 | Weiser | 106/19 B |
| 4,209,332 | 6/1980 | Tsujio | 106/19 B |
| 4,371,632 | 2/1983 | Grossman et al. | 106/19 B |
| 4,624,273 | 11/1986 | Carr | 132/216 |
| 4,668,572 | 5/1987 | Iizuka et al. | 106/19 B |
| 4,741,774 | 5/1988 | Lazar | 106/19 B |
| 4,859,242 | 8/1989 | Hughes et al. | 106/19 B |
| 4,990,013 | 2/1991 | Hejmanowski | 106/19 B |
| 5,261,952 | 11/1993 | Craig | 106/19 B |

FOREIGN PATENT DOCUMENTS 67081  3/1892  Fed. Rep. of Germany .

*Primary Examiner*—Helene Klemanski
*Attorney, Agent, or Firm*—Spencer, Frank & Schneider

[57] ABSTRACT

A colored lead composed of a basic substance of one or a plurality of fatty acids, an emulsifier and a binder includes metal and mica powder in order to produce a metallic and glossy effect.

4 Claims, No Drawings

COLORED LEAD

BACKGROUND OF THE INVENTION

1. Field of the Invention

The invention relates to a colored lead, particularly for color pencils, which draws a line having a metallic and glossy effect on paper or other drawing carriers.

2. Description of the Related Art

Such colored leads or color pencils have been known for a long time and are disclosed, for example, in German Patent No. 67,081 (from the year 1892). They include a basic paraffin substance in which are distributed coloring agents, pigments and metal powders as well as — in order to attain a glossy effect — mica powder. The prior art colored leads have the drawback of relatively low mechanical stability. As a result, they are very sensitive to breakage during writing and particularly during sharpening. Due to the low mechanical stability, it is also not possible to employ the prior art basic substance to produce leads that have a thin diameter, for example approximately 3 mm, for pencils drawing thin lines. In order to obtain leads that give a strong metallic and glossy effect, the percentages of metal and mica powder must be correspondingly high. This of course leads to a further reduction of the mechanical stability of the leads.

Another drawback of the prior art leads is that they cannot be applied softly and uniformly to the drawing carrier. Rather, the friction relationships between the tip of the lead and the drawing carrier change in an uncontrolled manner so that it is possible to draw only relatively jerky lines.

Based on the above, it is the object of the invention to provide colored leads producing a metallic and glossy effect which do not have the drawbacks of the prior art.

SUMMARY OF THE INVENTION

This is accomplished by providing a colored lead, particularly for color pencils, including a basic substance composed of one or a plurality of fatty acids, an emulsifier and a binder, characterized in that the basic substance includes mica and/or metal powders.

Accordingly, leads are provided whose basic substance includes one or several fatty acids, an emulsifier and a binder. Such leads are so-called emulsion leads. They are, in principle, state of the art but only in the form of simple colored leads without any metallic or glossy effect. The major component of emulsion leads may be, for example, stearic acid in which a binder, usually methyl cellulose, is distributed. In order to sufficiently disperse the two substances, it is necessary to add a W/O emulsifier. Moreover, coloring agents, for example in the form of pigments, may be added to these substances in quantities of about 0.4 to 30 weight percent.

DESCRIPTION OF THE PREFERRED EMBODIMENTS

Surprisingly it has now been found that leads produced from such substances with the addition of platelet-shaped metal powders and micas are able to produce brightly colored lines having a glossy or metallic effect with improved mechanical properties as well as a more uniform and softer writing behavior than paraffin leads.

One embodiment of a colored lead according to the invention has the following composition:

| | |
|---|---|
| fatty acid | 10% to 35%; |
| emulsifier | 0.5% to 5%; |
| binder | 5% to 15%; |
| coloring agents | 0.4% to 30%; |
| mica powder | 10% to 50%; |
| metal powder | 10% to 50%. |

An advantageous embodiment of a colored lead according to the invention has the following composition:

| | |
|---|---|
| stearic acid | 15 to 25 weight %; |
| W/O emulsifier | 0.5 to 2 weight %; |
| binder | 7 to 10 weight %; |
| pigments | 0.4 to 25 weight %; |
| mica powder | 25 to 45 weight %; |
| metal powder | 15 to 45 weight %. |

The stearic acid listed in the above recipe may also be replaced by other, long-chained saturated fatty acids which are solid at room temperature. Applicable are, for example, palmitic acid, margaric acid, but also nonadecylic acid. Mixtures of these fatty acids may also be employed.

Methyl cellulose is preferably used as the binder. However, other substances having corresponding characteristics such as, for example, dextrin, modified starch, etc., may also be employed.

Preferably the sorbitan esters available on the market for this purpose are employed as W/O emulsifier (water/oil emulsifier).

The mica powder employed as gloss imparting agent should preferably be colorless- Died species, particularly those whose particles have a coating of $TiO_2$, may also be employed for special purposes.

The metal powders employed are primarily those that have a platelet-like structure, that is, aluminum, copper or bronze powders. For special purposes, however, noble metals, particularly gold or gold alloys, may also be employed.

A recipe that has been found particularly satisfactory is the following:

| | |
|---|---|
| stearic acid | 20 weight %; |
| sorbitan ester | 1 weight %; |
| methyl cellulose | 7 to 10 weight %; |
| pigments | 0.4 to 25 weight %; |
| mica powder | 30 to 40 weight %; |
| Al, Cu or bronze powder | 18 to 40 weight %. |

All commercially available, inorganic and organic pigment substances can be employed as pigments, particularly those which are non-toxic. In addition to pure pigments, cut pigments (for example with an addition of aluminum silicate, magnesium silicate, talcum, alumina, kieselguhr or bentonite) may also be employed. Even brightened pigments can be employed, as long as the brightener is resistant to light.

The lead substance is advantageously produced in such a way that the mica, pigments, binder, and W/O emulsifier components are intimately mixed in a mixer or kneading apparatus. In a second step, the applicable metal powders are then added and mixing takes place again for a short time. The resulting substance is processed into leads in an extrusion process and the leads are subjected to the conventional drying and further processing steps.

What is claimed is:

1. A colored lead useful for colored pencils to draw a line on a carrier having a metallic and glossy effect, comprising:
   - a basic substance composed of at least one fatty acid;
   - an emulsifier;
   - a binder;
   - from 10 to 50% by weight of mica powder; and
   - from 10 to 50% by weight of at least one metal powder.

2. A colored lead useful for colored pencils to draw a line on a carrier having a metallic and glossy effect, comprising:
   - from 10 to 35% by weight of a basic substance composed of at least one fatty acid;
   - from 0.05 to 5% by weight of an emulsifier;
   - from 5 to 15% by weight of a binder;
   - from 0.4 to 30% by weight of at least one coloring agent;
   - from 10 to 50% by weight of mica powder; and
   - from 10 to 50% by weight of at least one metal powder.

3. The colored lead according to claim 2, comprising:
   - from 15 to 25% by weight of the at least one fatty acid which is stearic acid;
   - from 0.5 to 2% by weight of the emulsifier which is a water/oil emulsifier;
   - from 7 to 10% of the binder;
   - from 0.4 to 25% by weight of the at least one coloring agent which is at least one pigment;
   - from 25 to 40% of the mica powder; and
   - from 15 to 45% by weight of the at least one metal powder.

4. The colored lead according to claim 3, comprising:
   - 20% by weight of stearic acid;
   - 1% by weight of the water/oil emulsifier which is sorbitan ester;
   - from 7 to 10% by weight of the binder which is a cellulose ether;
   - from 0.4 to 25% by weight of the at least one coloring agent which is at least one pigment;
   - from 30 to 40% by weight of the mica powder; and
   - from 18 to 40% by weight of the at least one metal powder selected from the group consisting of aluminum, copper, and bronze powder.

* * * * *